US007913065B1

(12) United States Patent
Hettiaratchi

(10) Patent No.: US 7,913,065 B1
(45) Date of Patent: Mar. 22, 2011

(54) COMPRESSION OF PROCESSOR INSTRUCTIONS

(75) Inventor: Sambuddhi Hettiaratchi, High Wycombe (GB)

(73) Assignee: Altera Corporation, San Jose, CA (US)

( * ) Notice: Subject to any disclaimer, the term of this patent is extended or adjusted under 35 U.S.C. 154(b) by 373 days.

(21) Appl. No.: 11/588,100

(22) Filed: Oct. 25, 2006

(51) Int. Cl.
*G06F 9/30* (2006.01)
(52) U.S. Cl. ...................................... 712/208
(58) Field of Classification Search ................... 712/208
See application file for complete search history.

(56) References Cited

U.S. PATENT DOCUMENTS

| | | | | |
|---|---|---|---|---|
| 6,779,101 | B1 * | 8/2004 | Berg et al. | 712/24 |
| 7,409,530 | B2 * | 8/2008 | Kim et al. | 712/24 |

OTHER PUBLICATIONS

Wayne Wolf et al. "Code compression for VLIW processors using variable-to-fixed coding" ACM, Oct. 2002. pp. 138-143.*
Hennessy, J.L., Patterson, D.A. "Computer Organization: The Hardware/Software Interface" Morgan Kaufmann Publishers $2^{nd}$ edition, Jan. 1998, pp. 466-476.*
Aditya, Shail B. et al.; "Automatic Design of VLIW and EPIC Instruction Formats"; 2000, HP Laboratories, HPL-1999-94, 110 pages.
Colwell, Robert P. et al.; "A VLIW Architecture for a Trace Scheduling Compiler"; 1987, Multiflow Computer, pp. 180-192.
Heikkinen, Jari et al.; "Code Compression on Transport Triggered"; Institute of Digital and Computer Systems, 10 pages.
Heikkinen, Jari et al.; "Dictionary-Based Program Compression on Transport Triggered Architectures"; Tampere University of Technology, 4 pages.
Heikkinen, Jari et al.; "Evaluating Template-Based Instruction Compression on Transport Triggered Architectures"; Tampere University of Technology, 6 pages.
Jackson, Rob et al.; "Reconfigurable Radio with FPGA Based Application Specific Processors"; Altera European Technology Centre, 5 pages.
Nam, Sang-Joon et al.; "Improving Dictionary-Based Code Compression in VLIW Architectures"; 1999, IEICE Trans. Fundamentals, vol. E83, No. 11, pp. 2318-2324.
Suzuki, Hiroaki et al.; "Novel VLIW Code COmpaction Method for a 3D Geometry Processor"; 2000, IEEE Custom Integrated Circuits Conference, pp. 555-558.

* cited by examiner

*Primary Examiner* — Jacob Petranek
(74) *Attorney, Agent, or Firm* — Ropes & Gray LLP

(57) ABSTRACT

A custom processor is adapted for performing at least one predetermined application. The instruction sequence for the custom processor is compressed by performing at least one identification process on the instructions of the instruction sequence, in order to identify relationships between the contents of the bit positions in the instructions. A compressed instruction sequence then includes one compressed instruction corresponding to each instruction of the predetermined instruction sequence, with each compressed instruction comprising a reduced number of bits, based on the identified relationships between the contents of said bit positions in said instructions of said predetermined instruction sequence.

19 Claims, 3 Drawing Sheets

COMPRESSION OF PROCESSOR INSTRUCTIONS

BACKGROUND OF THE INVENTION

This invention relates to a processor, and in particular to the compression of instructions used by the processor.

In order to operate a processor, it is necessary to store a set of instructions for the operation of the processor. That is, there is typically associated with a processor a memory, which can be used to store the instructions that the processor will use. In some environments, the storage of these instructions can occupy a significant part of the available memory resources. It is known that it can be advantageous to apply some form of compression to the instructions where possible. Programs are stored into the memory in compressed format, then decompressed in the instruction decoding phase, and then executed in the processor.

It has been noted, in the document "Code Compression on Transport Triggered Architectures", J. Heikkinen et al., Proc. Int. Workshop on System-on-Chip for Real-Time Applications, Banff, Canada, Jul. 6-7 2002, pp. 186-195, that, in some applications, information is available about the probabilities of occurrence of each possible instruction. This information can be used to increase the efficiency of the coding of the instructions by using a form of entropy coding. That is, instructions that are expected to occur more frequently are encoded to a shorter code, while instructions that are expected to occur less frequently are encoded to a longer code, with the result that the average code length is reduced.

SUMMARY OF THE INVENTION

There are also processors that are intended to perform one specific application, or a group of applications. In the case of such an application specific processor (ASP), also referred to as an application specific instruction set processor (ASIP) or custom processor, the instruction sequence, or the possible instruction sequences if the processor is intended to perform a group of applications, is known in advance.

According to the present invention, this knowledge is exploited to allow the instructions to be compressed in a manner that is less complex, but potentially more efficient.

Specifically, according to an aspect of the invention, a method of storing an instruction sequence for a custom processor comprises receiving a predetermined instruction sequence, each instruction of said predetermined instruction sequence comprising a first number of bits in respective bit positions, and performing at least one identification process on said instructions, in order to identify relationships between the contents of said bit positions in said instructions of said predetermined instruction sequence, in order to allow a compressed instruction sequence to be generated.

According to another aspect of the invention, there is provided a processor, for performing at least one predetermined application, wherein the processor comprises a decoder and the decoder comprises: an input for receiving a first number of bits of compressed instructions; logic circuitry for converting said received first number of bits into a second number of bits of uncompressed instructions, said second number being greater than said first number; and an output for supplying said uncompressed instructions to be acted upon by said processor.

DETAILED DESCRIPTION OF EMBODIMENTS

Figure 1:
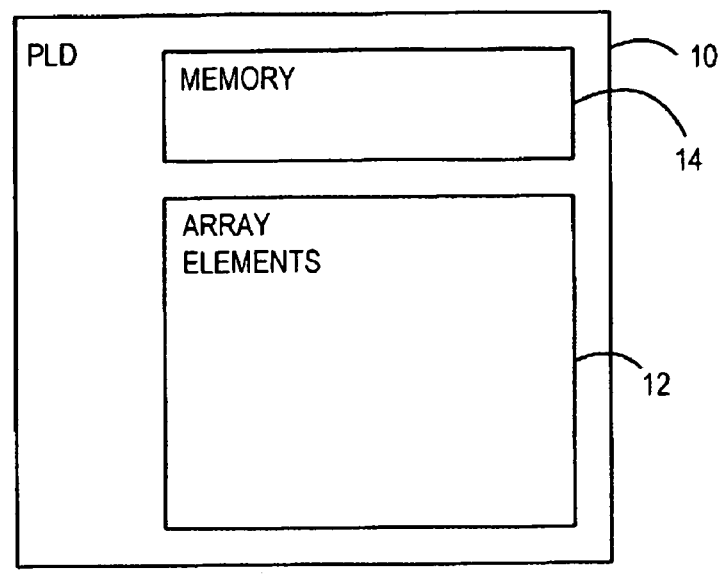
FIG. 1 is a block schematic diagram of a programmable logic device in accordance with the present invention.

FIG. 1 illustrates a programmable logic device (PLD) 10, for example in the form of a Field Programmable Gate Array (FPGA). In the illustrated PLD 10, there is an array 12 of processing elements and separate memory 14, although it will be appreciated that the invention is applicable to any type of device.

As is well known, a programmable logic device can be configured to perform a wide range of operations. That is, the interconnections between the array elements 12, and their functionality, are determined by configuration data, which is supplied to the device from a configuration memory (not shown in FIG. 1).

One possible use for a programmable logic device, such as the PLD 10, is to perform digital signal processing operations.

Where the digital signal processing operations are suitable, the PLD 10 can be configured to form an Application Specific Processor (ASP), using a Transport Triggered Architecture (TTA). This type of processor is particularly suitable when the functionality of the processor is known in advance. That is, when the processor is required to perform the same application, or the same limited set of applications, it can efficiently be configured to form an Application Specific Processor, rather than being configured such that it is able to perform a wide range of applications. When the digital signal processing operations require large amounts of data to be handled in parallel, a Transport Triggered Architecture (TTA) allows the data to be processed efficiently.

Figure 2:
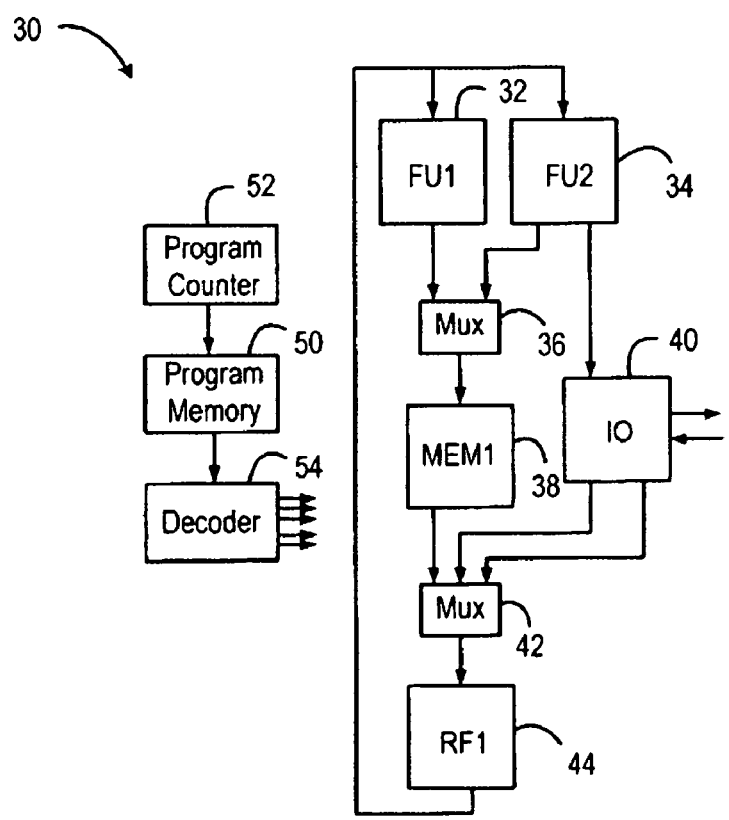
FIG. 2 is a block schematic diagram illustrating the functional components of a processor in accordance with the present invention.

FIG. 2 is a block schematic diagram, illustrating a processor 30 having a Transport Triggered Architecture, in accordance with an aspect of the present invention. It will be understood that the PLD 10 can be configured to form the processor 30 by means of appropriate configuration data, causing the array elements 12 and the memory 14 to be interconnected in such a way as to provide the required functionality shown in, and described with reference, to FIG. 2.

A TTA based custom processor includes a number of function units connected by a data transport network. The function units can for example be adders, multipliers, register files, memories, input/output units, multiplexers, combinational functions etc. Each function unit has a control input, for receiving program instructions.

Specifically, in the illustrative example shown in FIG. 2, the processor 30 includes a first functional unit (FU1) 32 and a second functional unit (FU2) 34, for performing some particular (unspecified in FIG. 2) functions on some data, with the outputs of the first and second functional units 32, 34 being applied to a first multiplexer 36, with the output of the first multiplexer 36 being applied to a first memory (MEM1) 38. The output of the second functional unit 34 is also applied to an input/output (IO) device 40, with the output of the first multiplexer 38 and two output lines from the input/output (IO) device 40 being applied to a second multiplexer 42, whose output is applied to a first register file (RF1) 44, and whose output in turn is applied to the first and second functional units 32, 34.

The processor 30 operates on the basis of a series of instructions, stored in compressed form in a program memory 50. The program memory steps through the stored instructions based on an input from a program counter 52.

The processor supports only one type of processing operation, namely a move operation, which transports data from a source to a destination. The data can then be processed in the destination function unit. The ability of the processor to handle data in parallel is determined by the number of such move operations that can be performed at the same time. Thus, for each time period, there exists an instruction word, potentially containing either a relevant move instruction, or an operand for that time period, for each of the function units.

The instruction word for each time period is then supplied to the control input of each function unit.

One potential disadvantage of TTA processors is that the requirement for a relatively long instruction word during each time period can mean that there is a need for a relatively large amount of memory to be used to store these instruction words. In accordance with an aspect of the present invention, the instruction words are stored in compressed form in the program memory 50, and then passed to an instruction decoder 54 in each cycle, before being passed to the control input of each function unit, for subsequent use in determining the operations performed by those units.

The ability to compress the required instruction words, and store them in a compressed form, has an impact on the amount of PLD resources required in order to implement the processor.

Figure 3:
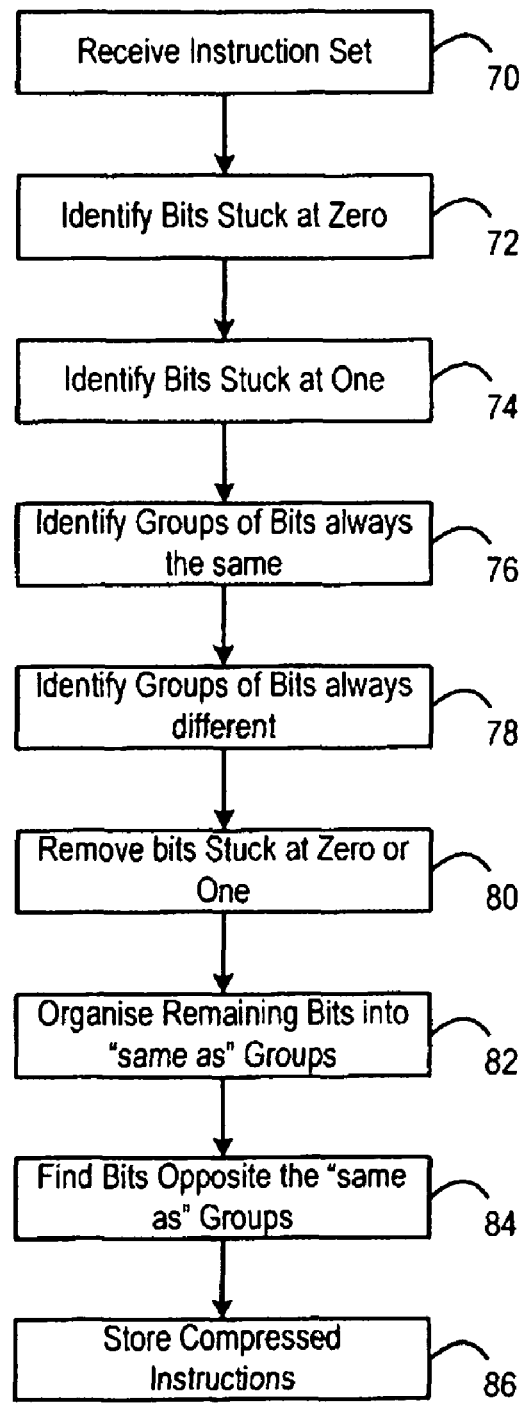
FIG. 3 is a flow chart illustrating a method in accordance with the present invention.

FIG. 3 is a flow chart, illustrating a method of compressing the instruction words, in accordance with an aspect of the invention.

The compression process is carried out, either by a tool or manually, when the custom processor 30 is built. It is carried out once for each custom processor design, and the processor is supplied with the compressed instruction set stored in the program memory 50. Several programs can be loaded into the custom processor and run on it at different times after it has been built, provided that all of those programs were analysed when building the custom processor.

The process begins at step 70, in which the required instruction set is received. The required instruction set may be the complete set of instructions required in order to cause the processor 30 to perform one specific application, or one group of applications. As described above, each instruction word of the instruction set will contain bits to drive the control inputs on the function units, and fields that provide operands to the function units. Depending on the application, each of these instructions may contain several tens or hundreds of bits.

The number of instruction words in the instruction set will depend on the application or applications that the processor is able to perform. However, as described above, in the case of an Application Specific Processor, the complete instruction set is known at the time that the functionality of the processor is determined.

It will be appreciated that a real case will include a relatively large number of instructions in the instruction set. However, the invention will be further illustrated with reference to a case where there are three instructions (I0-I3), each of which is six bits (B0-B5) long.

It will be noted that, in this example, the three instructions comprise the whole instruction set. However, in other examples, the instruction set may be divided into sections, with each section then being compressed independently. This may improve the degree of compression that can be achieved, but at the expense of requiring a more complex decoder hardware block 54.

It should also be noted that, in this illustrated case, the bits of the instructions can be logical zeros or logical ones, or could be such that their values are immaterial, that is, they are "don't care" logical values, although the invention still works when there are no don't care values.

The uncompressed instruction words in the illustrated case are shown in the following table, in which 'X' indicates a logical don't care value.

|    | B0 | B1 | B2 | B3 | B4 | B5 |
|----|----|----|----|----|----|----|
| I0 | X  | 1  | 0  | X  | 1  | 0  |
| I1 | 0  | 0  | 1  | 1  | 0  | 0  |
| I2 | 1  | 1  | 0  | 1  | 0  | 1  |

The instruction sequence is then analysed. In step 72, it is determined which bits of the instruction words are always zero, in each of the instruction words. In step 74, it is determined which bits of the instruction words are always one, in each of the instruction words. It should be noted that, in steps 72 and 74, bits that have the logical don't care value in one or more of the instruction words can be considered as bits that are always zero, or always one, as required.

In step 76, it is determined whether there are groups of bits which always have the same value, in each of the instruction words. In step 78, it is determined whether there is one or more bit which is always the opposite of one or more other bit, in each of the instruction words. Again, it should be noted that, in steps 76 and 78, bits that have the logical don't care value in one or more of the instruction words can be considered as being the same as, or opposite to, another bit, as required.

Thus, in the case of the instruction set illustrated in the table above, there are no bits that are always zero. The bit B3 can be considered as being always one, because it has the value one in the instructions I1 and I2, and its value is immaterial in the instruction I0.

Again, referring to the instruction set illustrated in the table above, the bit pairs {B0, B1} and {B0, B5} can be regarded as always the same as each other, because the value of the bit B0 is immaterial in the instruction I0. Also, the bit pairs {B0, B2} and {B1, B2} can be regarded as always the opposite of each other, again because the value of the bit B0 is immaterial in the instruction I0.

In step 80 of the process, any bits which are either stuck at one or zero are removed from the program word, and bit pairs involving stuck at one or zero bits are discarded.

In step 82, the remaining bits (that is, the bits {B0, B1, B2, B4, B5} in this case) are organized into groups which are the same as each other. For example, as mentioned above, when considering don't cares, B0 is the same as B1 and is also the same as B5. However, B0, B1 and B5 cannot all be grouped together, because B1 and B5 are not the same. Therefore, in the example considered here B0 and B1 are identified to be the same as each other. This identified "same as" group is then given one bit in the compressed word. It should be noted that a "same as" group can consist of just one bit, e.g. B5 in this case.

It should be noted that the choice of B0 and B1 as the "same as" group, rather than B0 and B5, is arbitrary, although it is possible that one choice will allow greater overall compression than the other, in which case it is that choice that should be made.

In step 84, the process determines which bits are opposite, in every instruction, the bits of one of the identified "same as"

groups. Thus, in this case, the bit B2 is always opposite both B0 and B1, and therefore can be regarded as opposite this "same as" group. These steps are repeated until all bits are compressed as far as possible. In step 86, the compressed instructions are then stored.

The following table shows the way in which, in the illustrated case, this achieves compression of the data word.

|    | CB0 | CB1 | CB2 |
|----|-----|-----|-----|
| I0 | 1   | 1   | 0   |
| I1 | 0   | 0   | 0   |
| I2 | 1   | 0   | 1   |

Thus, in this illustrated case, it is necessary to store only three compressed bits, CB0, CB1 and CB2, rather than the six bits of each uncompressed instruction.

The program memory 50 therefore stores one compressed instruction word corresponding to each instruction word in the uncompressed instruction set, with the compressed instruction words all being of the same length, and having been compressed so as to remove any redundancy within the instruction words of the instruction set.

It should be noted that FIG. 3 shows step 80, namely the removal of any bits that are either stuck at one or zero from the program word, being performed after steps 76 and 78, namely the identification of the groups of bits which always have the same value, in each of the instruction words, and the determination whether there is one or more bit which is always the opposite of one or more other bit. However, it may instead be advantageous to perform this removal step before identifying groups of bits which always have the same value, and before determining whether there is one or more bit which is always the opposite of one or more other bit. Bits that are either stuck at one or zero are already optimally compressed, and it is not necessary to include them in the further analysis steps.

Figure 4:
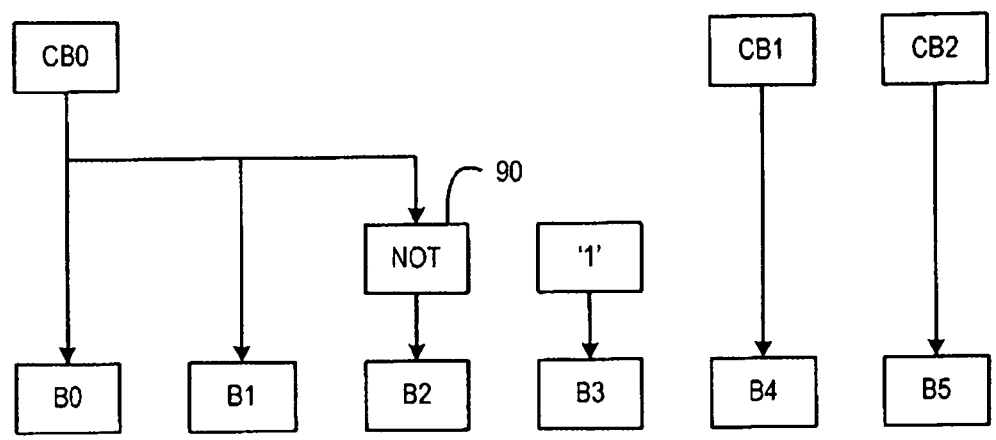
FIG. 4 is a schematic diagram illustrating a decoder in the processor of FIG. 2

FIG. 4 is a schematic diagram, illustrating the decoder 54, in the device of FIG. 2, in the case of this illustrated example. Specifically, the bit CB0 is used to provide the bits B0 and B1 of the uncompressed instructions, and is passed through a NOT logic gate 90 to provide the bit B2 of the uncompressed instructions.

The bit B3 of the uncompressed instructions has been identified as stuck at one, and so a "1" is supplied as the value of the bit B3 of the uncompressed instructions.

This method did not allow any compression of the bits B4 and B5 in this illustrated case, and so the bits CB1 and CB2 of the compressed instructions are used to provide the bits B4 and B5 of the uncompressed instructions.

It can therefore be seen that the only extra hardware needed to perform the decoding is the NOT gate 90. Moreover, in many cases this inversion can be combined into the logic that it is driving, and so no extra hardware would be needed.

The invention has been described above in relation to the implementation of the processor in a Programmable Logic Device. However, the processor shown in FIG. 2, or any processor containing the decoder described with reference to FIGS. 2 and 4, can equally be implemented in an ASIC (Application Specific Integrated Circuit), including a structured ASIC, that is, an ASIC in which many of the standard functions of the device are embedded into base layers of the integrated circuit, while the functions specific to that particular device are provided by customization of the top layers of the ASIC.

There are therefore provided a method of compressing an instruction set, and a processor, that allow an efficient compression of instructions, and hence a reduction in the amount of memory that must be provided for storage, while also permitting a relatively simple decompression method to be used.

The invention claimed is:

1. A method of providing a circuit having a custom processor, the method comprising:
   providing the custom processor on the circuit, the custom processor including one or more or more functional units;
   providing a program memory coupled with the custom processor through a decoder; and
   storing a compressed instruction sequence in the program memory, the compressed instruction sequence corresponding to a predetermined instruction sequence, wherein said predetermined instruction sequence includes a plurality of instructions, each instruction of said predetermined instruction sequence comprising a first number of bits in respective bit positions and being executed by at least one of the functional units of the custom processor during a different clock cycle;
   wherein the compressed instruction sequence is determined by:
      performing at least one identification process on said instructions, in order to identify relationships between the bits in said bit positions among said instructions of said predetermined instruction sequence;
      generating a compressed instruction sequence, comprising one compressed instruction corresponding to each instruction of the predetermined instruction sequence, and each compressed instruction comprising a second number of bits, based on the identified relationships between the bits in said bit positions in said instructions of said predetermined instruction sequence.

2. The method as claimed in claim 1, wherein performing at least one identification process on said instructions includes identifying bit positions in said instructions of said predetermined instruction sequence which contain a same bit value in each instruction.

3. The method as claimed in claim 2, wherein performing at least one identification process on said instructions includes identifying bit positions in said instructions of said predetermined instruction sequence which contain a binary "1" in each instruction.

4. The method as claimed in claim 2, wherein performing at least one identification process on said instructions includes identifying bit positions in said instructions of said predetermined instruction sequence which contain a binary "0" in each instruction.

5. The method as claimed in claim 1, wherein performing at least one identification process on said instructions includes identifying pairs of bit positions in said instructions of said predetermined instruction sequence which contain a same bit value as each other in each instruction.

6. The method as claimed in claim 1, wherein performing at least one identification process on said instructions includes identifying pairs of bit positions in said instructions of said predetermined instruction sequence which contain opposite bit values in each instruction.

7. A processor, for performing at least one predetermined application, wherein the processor comprises a decoder and the decoder comprises:

an input for receiving a first number of bits of a compressed instruction for each of a plurality of compressed instructions, each bit having a value;

logic circuitry for converting said received first number of bits for each compressed instruction into a second number of bits of an uncompressed instruction, said second number being greater than said first number, wherein the logic circuitry includes circuitry for providing a fixed value for a same bit of each uncompressed instruction regardless of the values of the first number of bits received at the input for any compressed instruction; and an output that supplies all of the bits of said uncompressed instructions to a functional unit of said processor, wherein the functional unit is adapted to act upon the uncompressed instructions sequentially and to perform one operation for each uncompressed instruction.

8. The processor as claimed in claim 7, the decoder further comprising a high level signal supply, for providing the fixed value of a logic one as the fixed value of the same bit in each of said uncompressed instructions.

9. The processor as claimed in claim 7, the decoder further comprising a low level signal supply, for providing the fixed value of a logic zero as the fixed value of the same bit in each of said uncompressed instructions.

10. The processor as claimed in claim 7, wherein the logic circuitry comprises a separator, for receiving a first bit of said received first number of bits, and for supplying the value of said first bit as the value of a plurality of said second number of bits.

11. The processor as claimed in claim 7, wherein the processor is implemented in a Programmable Logic Device.

12. The processor as claimed in claim 7, wherein the processor is implemented in an Application Specific Integrated Circuit.

13. A processor, for performing at least one predetermined application, wherein the processor comprises a decoder and the decoder comprises:

an input for receiving a first number of bits of compressed instructions, each bit having a value;

logic circuitry for converting said received first number of bits into a second number of bits of uncompressed instructions, said second number being greater than said first number; and an output that supplies all of said uncompressed instructions to a functional unit of said processor, wherein the functional unit is adapted to act upon the uncompressed instructions, wherein the logic circuitry comprises an inverter, for receiving a first bit of said received first number of bits, and for supplying an inverse of the value of said first bit as the value of at least one of said second number of bits.

14. A processor, for performing at least one predetermined application, wherein the processor comprises a memory storing a compressed instruction sequence and one or more functional units coupled with the memory through a decoder, said compressed instruction sequence having been obtained by:

receiving a predetermined instruction sequence, each instruction of said predetermined instruction sequence comprising a first number of bits in respective bit positions and being executed by at least one of the functional units of the processor during a separate clock cycle;

performing at least one identification process on said instructions, in order to identify relationships between the bits in said bit positions among said instructions of said predetermined instruction sequence;

generating said compressed instruction sequence, comprising one compressed instruction corresponding to each instruction of the predetermined instruction sequence, and each compressed instruction comprising a second number of bits, based on the identified relationships between the bits in said bit positions in said instructions of said predetermined instruction sequence, wherein said second number of bits is smaller than said first number of bits.

15. The processor as claimed in claim 14, wherein each compressed instruction comprises a same second number of bits.

16. The processor as claimed in claim 14, wherein the processor is implemented in a Programmable Logic Device.

17. The processor as claimed in claim 14, wherein the processor is implemented in an Application Specific Integrated Circuit.

18. The processor as claimed in claim 14, wherein performing at least one identification process on said instructions includes identifying bit positions in said instructions of said predetermined instruction sequence which contain a same bit value in each instruction.

19. The processor as claimed in claim 14, wherein performing at least one identification process on said instructions includes identifying pairs of bit positions in said instructions of said predetermined instruction sequence which contain opposite bit values in each instruction.

* * * * *